United States Patent Office 3,139,420
Patented June 30, 1964

3,139,420
HEAVY METAL-CONTAINING FORMAZANE DYESTUFFS
Fabio Beffa and Guido Schetty, Basel, Switzerland, assignors to J. R. Geigy A.-G., Basel, Switzerland
No Drawing. Filed May 11, 1961, Ser. No. 109,266
Claims priority, application Switzerland May 12, 1960
6 Claims. (Cl. 260—149)

The present invention concerns new, heavy metal-containing dyestuffs of the formazane series, processes for the production thereof, also the use of these dyestuffs for the dyeing and printing of organic materials, particularly textile materials, and, as industrial products, the material fast dyed with these dyestuffs.

It has been found that valuable metal-containing formazane dyestuffs are obtained if formazane compounds of the general Formula I

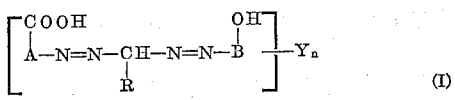  (I)

are treated with agents giving off copper or nickel. In Formula I:

A and B each represent an aromatic radical of the benzene or naphthalene series which contains the COOH— or the OH group in o-position to the azo bond,
R represents an aromatic radical of the benzene or naphthalene series,
Y represents a monovalent, possibly further substituted aliphatic, cycloaliphatic or aromatic hydrocarbon radical containing at least 4 carbon atoms, bound to the formazane radical by an —$SO_2$—, —$SO_2NR'$— (R' being hydrogen, an aliphatic, cycloaliphatic or an aromatic radical), —$SO_2O$—, —$SO_2NHSO_2$—, —$CH_2$— or —CO—bridge, and
n represents a low positive whole number, advantageously 1 or 2.

If n is greater than 1, then the substituents given for Y can be identical or, within the limits of the definition of Y, different from each other.

R is advantageously an aromatic radical of the benzene series, e.g. the phenyl radical.

Y is advantageously an aromatic radical of the naphthalene and, mainly, of the benzene series bound to the formazane radical, advantageously at A and/or B, by a —CO—, —$SO_2$— or $SO_2NR_1$— bridge ($R_1$ being hydrogen or, in particular, an alkyl group).

The formazane compounds corresponding to the Formula I contain advantageously 4 or 5 aromatic radicals of the benzene and/or naphthalene series or three or four radicals as well as an aliphatic or cycloaliphatic radical. In addition to Y they can contain other substituents usual in dyestuffs such as, e.g. low aliphatic groups, e.g. the methyl, ethyl, propyl or isopropyl group, low alkoxy groups, e.g. the methoxy or ethoxy group, halogen atoms such as, e.g. chlorine or bromine atoms, also nitro, cyano or low alkylcarbonyl groups such as, e.g. the acetyl group, or low acylamino groups such as, e.g. the acetylamino group.

Advantageously, the formazane compounds of Formula I contain 1 salt-forming group which dissocates acid in water such as, e.g. a sulphonic acid, carboxylic acid or phosphonic acid group, advantageously only in B and/or in R. However, they can also contain 1 or 2 water solubilising groups which do not dissocate acid in water such as, e.g. sulphonic acid amide groups or low sulphonic acid alkylamide groups, e.g. the sulphonic acid methylamide group or low alkylsulphonyl groups such as, e.g. the methylsulphonyl or chloromethylsulphonyl group.

The formazane compounds of Formula I can be produced by known methods.

For example, by condensing an aldehyde with the hydrazine from one of the two amines of Formula II or III

(advantageously with the hydrazine from the amide of the Formula II), wherein A and B have the meanings given in Formula I, and coupling the hydrazone obtained with a diazonium compound from the other amine.

Or, for example, an equivalent of each of the diazonium compounds from the amides of both Formula II and Formula III is coupled with a methine compound which is capable of coupling twice while splitting off 1 or 2 groups which can easily be split off or which can be converted into such groups, such as, e.g. the formyl, acetyl, carboxylic acid, carboxylic acid ester, carboxylic acid amide or nitrile groups.

In both processes, the components are to be so chosen that the end product contains at least one substituent as defined for Y.

Examples of amines of the Formula II usable according to the inveniton are:

2-aminobenzene-1-carboxylic acid, 3- or 4-methyl-2-aminobenzene-1-carboxylic acid, 3,5-dimethyl-2-aminobenzene-1-carboxylic acid, 3- or 4-chloro- or 3- or 4-bromo-2-aminobenzene-1-carboxylic acid, 3,5-dichloro- or 3,5-dibromo-2-aminobenzene-1-carboxylic acid, 3-, 4- or 5-nitro-2-aminobenzene-1-carboxylic acid, 3,5-dinitro-2-aminobenzene-1-carboxylic acid, 2-aminobenzene-1,3-dicarboxylic acid, 4-methylsulphonyl-2-aminobenzene-1-carboxylic acid, 4-ethylsulphonyl-2-aminobenzene-1-carboxylic acid, 5- acetylamino-2-aminobenzene-1-carboxylic acid, 2-aminobenzene-1-carboxylic acid-4- or -5-sulphonic acid or -4- or -5-sulphonic acid amide, 2-aminonaphthalene-3-carboxylic acid, 2-aminonaphthalene-3-carboxylic acid-5-sulphonic acid, 2-aminobenzene-1-carboxylic acid-4- or -5-sulphonic acid-N-phenylamide, -N-(2'- or 4'-methylphenylamide), -N-(2',4' - dimethylphenylamide), -N-(2'- or -4'-chlorophenylamide, -N-(2'- or -4'-bromophenylamide), -N-(2'- or 4'-methoxyphenylamide), -N-(2'- or 4'-ethoxyphenylamide, -N-phenylamide-2'-, -3'- or -4'-sulphonic acid or -sulphonic acid amide, -N-methyl-N-phenylamide, -N-ethyl-N-phenylamide, -N-methyl-N-phenylamide-4'-sulphonic acid, -N-ethyl-N-phenylamide-4'-sulphonic acid or -4'-sulphonic acid amide, -N-butylamide, -N-amylamide, -N-cyclohexylamide, -N,N-dicyclohexylamide, -N-γ-methoxy-propylamide, 4-amino-benzophenone-3-carboxylic acid, 5-phenylsulphonyl-2-aminobenzene-1-carboxylic acid, 5-phenylsulphonyl-2-aminobenzene-1-carboxylic acid-3'-sulphonic acid or -3'-sulphonic acid amide.

Amines of Formula III usable according to the invention are, for example:

2-amino-1-hydroxybenzene, 4-methyl-2-amino-1-hydroxybenzene, 4,6-dimethyl-, 4-chloro- or 4-bromo-, 5-chloro- or 5-bromo-, 4,6-dichloro- or 4,6-dibromo-, 4- or 5-nitro-, 4,6-dinitro-, 4-chloro-6-nitro- or 6-chloro-4-nitro-2-amino-1-hydroxybenzene, also 2-amino-1-hydroxybenzene-4- or 5-sulphonic acid, 2-amino-1-hydroxybenzene-4,6-disulphonic acid, 4-methyl-2-amino-1-hydroxybenzene-6-sulphonic acid, 4-chloro-2-amino-1-hydroxybenzene-6-sulphonic acid, 6-chloro-2-amino-1-hydroxybenzene-4-sulphonic acid, 2-amino-1-hydroxybenzene-4- or -5-sulphonic acid amide, -4- or -5-sulphonic acid methylamide, -4- or -5-sulphonic acid ethylamide, -4- or -5-sulphonic acid dimethylamide or -4- or -5-sulphonic acid diethylamide, 4- or 5-methylsulphonyl-, 4- or 5-ethylsulphonyl- or 4- or 5-propylsulphonyl-2-amino-1-hydroxybenzene, 2-amino-1-hydroxynaphthalene, 1-amino-2-hydroxynaphthalene, 1-amino-2-hydroxynaphthalene-4-sulphonic acid or -4-sulphonic acid amide, 6-nitro-1-amino-2-hydroxynaphthalene-4-sulphonic acid, 2-amino-1-hydroxybenzene-4- or -5-sulphonic acid-N-phenylamide, -N-(2'-, -3'- or -4'-methylphenylamide), -N-(2',4'-dimethylphenylamide), -N-(2'-, -'3- or -4'-chlorophenyl amide), -N-(2'-, -3'- or -4'-bromophenylamide), -N-(2',4'-dichloro- or -dibromo-phenylamide), -N-(2'- or -4'-methoxyphenylamide or -N-(2'- or 4'-ethoxyphenylamide), -N-phenylamide-2'-carboxylic acid, -N-(2'-chloro-5'-methylsulphonylphenylamide), -N-methyl-N-phenylamide or -N-ethyl-N-phenylamide, -N-methyl-N-phenylamide- or -N-ethyl-N-phenylamide-2'-, -3'- or -4'- sulphonic acid or -2'-, -3'- or -4'-sulphonic acid amide, -N-butylamide or -N-amylamide, -N-cyclohexylamide, -N,N-dicyclohexylamide, also 2-amino-1-hydroxybenzene-4-sulphonic acid -phenylester or -(4'-methyl-phenylester), 4-amyl-2-amino-1-hydroxybenzene, 4-isoamyl-2-amino-1-hydroxybenzene, 3-amino-4-hydroxybenzophenone, 3 - amino-4-hydroxybenzophenone-3'-sulphonic acid or -3'-sulphonic acid amide, 3-amino-4-hydroxybenzophenone-2'-carboxylic acid, 3 - amino-4-hydroxyacetophenone, 4 - phenylsulphonyl-2-amino-1-hydroxybenzene, 4-phenylsulphonyl-2-amino-1-hydroxybenzene-3'-sulphonic acid or -3'-sulphonic acid amide, 5-phenylsulphonyl-2-amino-1-hydroxybenzene, 4 - butylsulphonyl-2-amino-1-hydroxybenzene, 4 - amylsulphonyl-2-amino-1-hydroxybenzene, 4-cyclohexylsulphonyl-2-amino-1-hydroxybenzene or 3-amino-4-hydroxy-diphenyldisulphimide.

Examples of aldehydes used principally for the reaction with aryl hydrazines are; benzaldehyde, methylbenzaldehyde, 2- or 4-chlorobenzaldehyde, 2,4- or 2,6-dichlorobenzaldehyde, 3-nitrobenzaldehyde, 4-methoxybenzaldehyde, 4-phenylsulphonyl-1-benzaldehyde, benzaldehyde-2- or -4-sulphonic acid, benzaldehyde-2,4-disulphonic acid, 1- or 2-naphthaldehyde.

Advantageously, methine compounds which can be coupled twice are used, in particular phenylformyl acetic acid alkyl ester, also however, the corresponding nitrile; in addition 3-methylphenylformyl acetic acid alkyl ester, phenylcyanoacetic acid, phenylcyanoacetic acid alkyl ester and amide, α-phenylacetoacetic acid alkyl ester and nitrile, α-phenyloxalacetic acid diethyl ester, phenylcyanopyruvic acid alkyl ester, ω-phenyl-ω-cyanoacetophenone, 2-phenyl-indandione-(1,3) or also α-naphthylformyl acetic acid alkyl ester can be used.

The usual agents giving off copper or nickel are used for the metallisation of the metal-free formazane compounds of the general Formula I. The simple or complex, soluble salts of nickel and, principally, copper are used. If complex salts of these metals are used, anionic components thereof bound in complex linkage may possibly occur in the end product. On using salts of mineral acids to introduce the metal, the metallisation is performed advantageously in the presence of a mineral acid buffering agent, as which, for example, alkali hydroxides or alkali carbonates or alkali metal salts of low fatty acids such as, e.g. alkali acetates, or alkali metal salts of polybasic oxygen acids of phosphorus, or ammonia or tertiary nitrogen bases such as, e.g. pyridine bases are used. The metallisation agent is used in at least equimolar amounts so that there is at least 1 heavy metal atom per mol dyestuff. Often the metallisation is completed even at room temperature, frequently however, a slight heating, for example to about 80°, is necessary.

A modification of the process according to the invention consists in starting from metallisable monoazo dyestuffs which are suitable for the formation of formazane compounds of the general Formula I, treating these first with an agent introducing copper or nickel and then coupling to form the complete dyestuff.

Such intermediate products correspond to the general formula

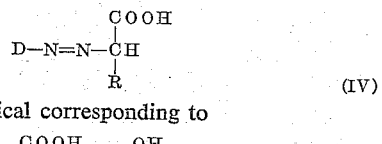

wherein D is a radical corresponding to

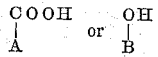

A, B and R having the meanings given in Formula I.

They are obtained, for example, by coupling 1 mol of a diazonium compound from amines of the general Formula II or III with a methine compound which, on completion of the coupling, still contain a carboxyl group or a substituent which can be converted into such a group at the methine-C atom, such as, for example, a nitrile or carboxylic acid ester group. After such a substituent has been converted into the carboxyl group if necessary, the intermediate product of the above Formula IV is treated with the agent giving off copper or nickel and then coupled with 1 mol of a diazonium compound from amines of the general Formula III or II to form the metal-containing formazane dyestuff. In this process, the components are so chosen that at least one of them is substituted at least once by Y. In this modified process, the metallisation and second coupling are performed advantageously in a single step.

If the reaction is performed in a sufficiently alkaline medium, then the nitrile or carboxylic acid ester groups can be saponified immediately beforehand in the same reaction medium.

The heavy metal-containing formazane dyestuffs produced according to the invention are worked up and isolated by the usual methods. Crude products are possibly purified by dissolving and allowing to crystallise.

Dyestuffs according to the invention having no water solubilising groups can be used as pigment dyestuffs for the dyeing, for example, of synthetic materials, lacquers, varnishes or acetyl cellulose or polyamide spinning masses.

Those dyestuffs containing water solubilising groups such as, e.g. carboxylic acid or phosphonic acid groups and, mainly, sulphonic acid groups, are suitable for the dyeing and printing of leather, paper and fibre material of the most various types, in particular of textile material from natural or synthetic polypeptides such as, e.g. wool, silk, synthetic polyamide and polyurethane fibres. Textile material of this type is dyed in particular with dyestuffs according to the invention which contain at most one sulphonic acid group; in many cases they draw onto this material even from a neutral to weakly acid bath. Another valuable group of dyestuffs according to the invention is those which, apart from the groups taking part in the complex formation, contain no other acid dissociating groups, in particular no carboxylic acid or sulphonic acid groups, but which owe their water solubility to substituents such as, e.g. low alkyl-sulphonyl groups, the sulphonic acid amide group and sulphonic acid amide groups substituted by low molecular hydrocarbon radicals. These dyestuffs have very good affinity to wool and material having a similar dyeing behaviour thereto and they even draw completely onto such fibres from a neutral to weakly acid bath.

The water solubility of such dyestuffs containing no sulphonic acid groups is possibly improved by the admixture of anion active or non-ionogenic wetting or dispersing agents.

The preferred formazane dyestuffs correspond to the general formula

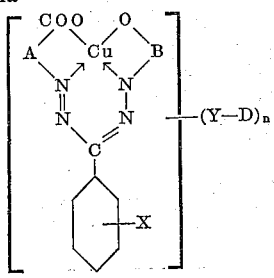

wherein
A represents a radical selected from the group consisting of the benzene and naphthalene series, the bonds shown in o-position to each other,
B represents a radical of the benzene series, the bonds shown being in o-position to each other,
D represents a radical of the benzene series,
Y represents a member selected from the group consisting of

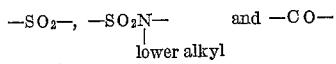

X represents a member selected from the group consisting of H, Cl, $CH_3$, $OCH_3$ and $SO_3H$, and
$n$ is one of the numerals 1 and 2.

As has already been mentioned, the dyestuffs advantageously contain a water solubilising group at the aromatic nuclei, in particular at D, examples of such a group being the $-SO_3H$, $-COOH$, alkylsulphonyl or sulphonic acid amide group.

In the above Formula A can be an unsubstituted phenyl radical or it can be a phenyl radical substituted in particular by chlorine, lower alkyl, sulphonic acid and functionally converted sulphonic acid amide groups such as alkylsulphonyl and sulphonic acid amide groups, examples of which are the $SO_2-NH_2$, $-SO_2NH$-alkyl, $-SO_2NH$-aryl, $-SO_2NH$-cycloalkyl and $-SO_2N$-dialkyl groups. If A is a phenyl radical, it can also be substituted by $-Y-D$. Also, however, A can a naphthyl radical, preferably unsubstituted.

The benzene nucleus B is preferably substituted by the group $-Y-D$ and this in the 4- and, in particular, the 5-position. It can also be substituted, however, by, e.g. nitro, methyl, chlorine, and in particular, by water solubilising groups such as sulphonic acid groups, alkylsulphonyl and sulphonic acid amide groups.

The benzene nucleus D can be unsubstituted or, for example, substituted by chlorine, lower alkyl, lower alkoxy and, in particular, by water solubilising groups such as $-SO_3H$, $-COOH$, $-SO_2$-alkyl and sulphonic acid amide groups, e.g. $-SO_2NH_2$, $-SO_2NH$-alkyl or $-SO_2N$-dialkyl.

Principally the groups

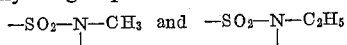

and, in the second instance the group $-SO_2-$ are employed as bridging member Y.

$n$ is preferably 1.

Particularly valuable dyestuffs are those embraced by the general formula

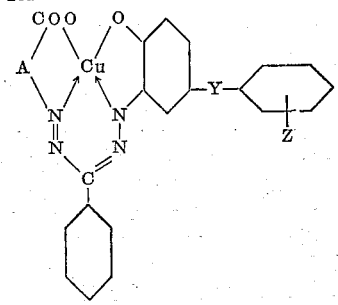

wherein
A represents a radical selected from the group consisting of the benzene and naphthalene series, the bonds shown being in o-position to each other,
Y represents a member selected from the group consisting of $-SO_2-$ and $$-SO_2-N\text{-lower alkyl}$$

and
Z repersents a member selected from the group consisting of $-SO_3H$ and $-SO_2NH_2$ and $-SO_2$-alkyl.

The textile dyeings attained with the dyestuffs according to the invention are distinguished in particular by good fastness to light and rubbing and the improved wet fastness properties such as, e.g. good washing, alkali, milling, sea water and decatising fastness properties. In addition, the dyeings are very level and their shade is relatively very pure.

Further details can be seen from the following examples. Where not otherwise expressly stated, parts are given therein as parts by weight. The temperatures are in degrees centigrade. The relationship of parts by weight to parts by volume is as that of grammes to cubic centimetres.

EXAMPLE 1

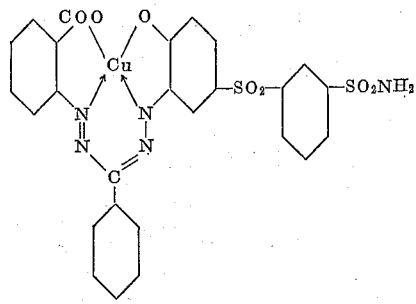

32.8 parts of 4-phenylsulphonyl-2-amino-1-hydroxybenzene-3'-sulphonic acid amide are dissolved in 100 parts of hot water with 21 parts of 10 N-caustic soda lye, a solution of 6.9 parts of sodium nitrite is added and, after cooling to 5°, the whole is stirred into a mixture of 42 parts of concentrated hydrochloric acid, 100 parts of water and 50 parts of ice. Traces of excess nitrous acid are decomposed with sulphamic acid. The reaction is then neutralised with sodium bicarbonate until Congo red paper no longer turns blue, whereupon the brown-yellow suspension of the diazonium compound is poured at 0-10° into a solution of 24 parts of hydrazone from phenyl hydrazine-2-carboxylic acid and benzaldehyde in 150 parts of water and 100 parts by volume of dioxan. The reaction mixture is then made strongly alkaline by the dropwise addition at 0-5° of 10 N-caustic soda lye.

On completion of the coupling, the pH of the reaction mixture is adjusted to 8 and 150 parts by volume of copper tetramine sulphate solution (corresponding to 6.4 parts of copper) are added.

After stirring for several hours at room temperature, the reaction mixture is heated at 80-90° until the blue copper complex compound has formed. The dyestuff is precipitated by the addition of sodium chloride, filtered off, washed with dilute sodium chloride solution and dried.

After drying, it is a dark powder which dyes wool from a neutral to weakly acid bath in pure, fast, blue shades.

If, in the above example, the 4 - phenylsulphonyl - 2-amino-1-hydroxybenzene-3'-sulphonic acid amide is replaced by 37.1 parts of 2-amino-1-hydroxybenzene-4-sulphonic acid - N - ethyl - N-phenylamide-4'-sulphonic acid amide or by 37.2 parts of 2-amino-1-hydroxybenzene-4-sulphonic acid-N-ethyl-N-phenylamide-4'-sulphonic acid or by 37.2 parts of 2-amino-1-hydroxybenzene-4-sulphonic acid - N - ethyl-N-phenylamide-3'-sulphonic acid, then dyestuffs having similar properties are obtained.

Further copper complex dyestuffs which dye wool in pure blue shades are obtained by the processes described in Example 1 on using the diazonium compounds given in column II of the following table and on using the hydrazones given in column III instead of the compounds mentioned above.

Table

| I No. | II Diazonium compound | III Hydrazone from— | |
|---|---|---|---|
| | | Hydrazine | Aldehyde |
| 1 | 2-amino-1-hydroxy-benzene-4-sulphonic acid-N-methyl-N-phenyl-amide. | Phenylhydrazine-2-carboxylic acid-4-sulphonic acid. | 4-chlorobenzalde-hyde. |
| 2 | ----do---- | ----do---- | 4-methoxy-benzal-dehyde. |
| 3 | 3-amino-4-hydroxy-benzophenone-2'-carboxylic acid. | Phenylhydrazine-2-carboxylic acid. | Do. |
| 4 | 4-phenylsulphonyl-2-amino-1-hydroxybenzene-3'-sulphonic acid. | ----do---- | 2,6-dichloro-benzal-dehyde. |
| 5 | ----do---- | ----do---- | 4-chloro-benzalde-hyde. |
| 6 | 4-phenylsulphonyl-2-amino-1-hydroxybenzene. | ----do---- | Benzaldehyde-2-sulphonic acid. |
| 7 | 2-amino-1-hydroxy-benzene-4-sulphonic acid-N-methyl-N-phenyl-amide. | ----do---- | Do. |

EXAMPLE 2

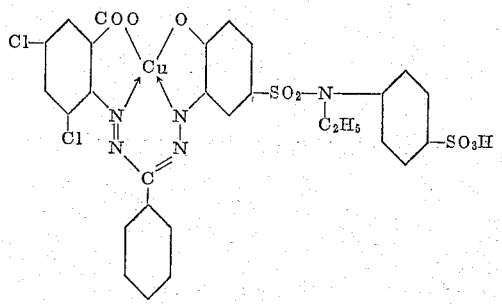

37.2 parts of 2-amino-1-hydroxybenzene-4-sulphonic acid-N-ethyl-N-phenylamide-4'-sulphonic acid are indirectly diazotised by the usual method. The diazonium compound is slowly added, while stirring well, at 0–10° to a suspension of 20.4 parts of phenylformyl acetic acid ethyl ester in 200 parts of water, 250 parts by volume of dioxan and 10.5 parts by volume of a 10 N-caustic soda lye solution, the addition being made in the presence of such an amount of calcinated sodium carbonate that on completion thereof, the reaction mixture turns phenolphthalein paper slightly red. On completion of the coupling, the pH of the reaction mixture is adjusted to 7 by the addition of concentrated hydrochloric acid, whereupon it is diluted and boiled. After the addition of as much 10 N-caustic soda lye necessary to maintain a strong alkaline reaction until completion of the saponification, the reaction product is kept boiling under reflux for 10 to 20 minutes.

The solution of the saponification product is then made weakly acid with glacial acetic acid and a copper sulphate solution (corresponding to 7 parts of copper) is added. The mixture is then reacted at 0–10° with the diazonium salt from 20.6 parts of 3,5-dichloro-2-amino-benzene-1-carboxylic acid which has been made weakly acid with sodium acetate. After heating the reaction mixture to 80–90°, the pH of the dyestuff suspension is adjusted to about 8–9 by the addition of sodium carbonate and the blue formazane copper complex is precipitated by the addition of sodium chloride. It is filtered off, washed with sodium chloride solution and dried. After drying it is a dark powder which dyes wool from a neutral to weakly acid bath in pure, fast, blue shades.

If, in the above example, the 2-amino-1-hydroxybenzene-4-sulphonic acid-N-ethyl-N-phenylamide-4'-sulphonic acid is replaced by 32.9 parts of 4-phenylsulphonyl-2-amino-1-hydroxybenzene-3'-sulphonic acid or by 32.8 parts of 4-phenylsulphonyl-2-amino-1-hydroxybenzene-3'-sulphonic acid amide or by 25.7 parts of 3-amino-4-hydroxybenzophenone-2'-carboxylic acid, then similar dyestuffs are obtained.

EXAMPLE 3

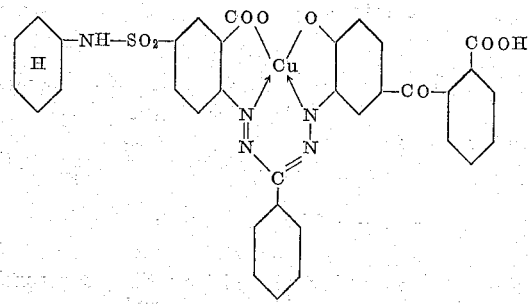

25.7 parts of 3-amino-4-hydroxybenzophenone-2'-carboxylic acid are indirectly diazotised in the usual way, coupled under the conditions given in Example 2 with 20.4 parts of phenylformyl acetic acid ethyl ester and the ester group in the coupling product is saponified with dilute caustic soda lye. The solution of the saponification product is then neutralised with acetic acid, treated with a solution of copper sulphate (corresponding to 7 parts of copper), and reacted at 0–10° with the diazonium salt obtained by diazotising 29.8 parts of 2-amino-benzene-1-carboxylic acid-5-sulphonic acid-N-cyclohexyl-amide which has been made acetous with acetic acid.

On completion of the dyestuff formation, the pH of the reaction mixture is adjusted to about 8–9 by the addition of sodium carbonate.

The formazane complex compound is salted out at 85° and filtered off.

After drying, a dark powder is obtained which dyes wool in pure, fast, blue shades.

If in the above example, the 3-amino-4-hydroxybenzophenone-2'-carboxylic acid is replaced by 32.9 parts of 4 - phenylsulphonyl - 2 -amino - 1 - hydroxybenzene - 3'-sulphonic acid or by 37.2 parts of 2-amino-1-hydroxybenzene - 4-sulphonic acid-N-ethyl-N-phenylamide-4'-sulphonic acid or 2 - amino - 1-hydroxybenzene-4-sulphonic acid-N-ethyl-N-phenylamide-3'-sulphonic acid, then dyestuffs are obtained which have similar properties.

EXAMPLE 4

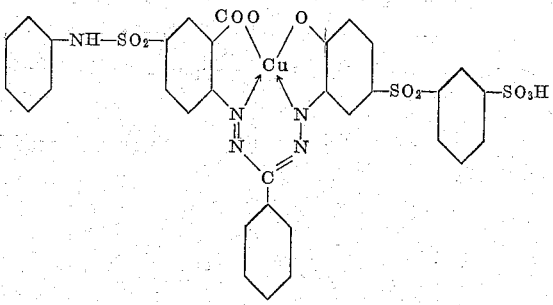

32.9 parts of 4 - phenylsulphonyl - 2-amino-1-hydroxy-benzene-3'-sulphonic acid are indirectly diazotised by the usual method and coupled with 20.4 parts of phenyl-formyl acetic acid ethyl ester. After the addition of sufficient caustic soda lye to ensure a strong alkaline reaction until the end of the saponification, the coupling product is boiled under reflux for 10 minutes. The pH of the solution of the saponification product is then adjusted to 8 by the addition of hydrochloric acid, 150 parts of a copper sulphate solution (corresponding to 25 parts of crystallised copper sulphates) are added at 10–15° and the whole is reacted with the diazonium salt obtained by diazotising 29.2 parts of 2-aminobenzene-1-carboxylic acid-5-sulphonic acid-N-phenylamide which has been made acetous with sodium acetate. On completion of the dyestuff formation, the pH of the suspension of the dyestuff is adjusted to about 9 by the addition of sodium carbonate. The copper-containing formazane complex is precipitated at 85–90° by the addition of sodium chloride, filtered off, washed with dilute sodium chloride solution and dried.

After drying, it is a dark powder which dyes wool from a neutral to weakly acid bath in fast, pure, blue shades.

EXAMPLE 5

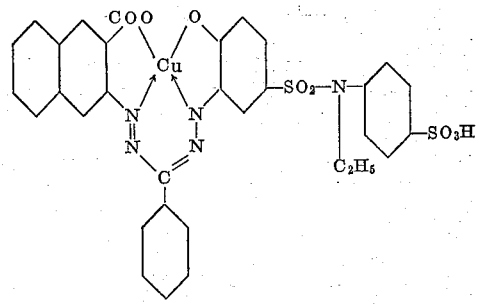

37.2 parts of 2 - amino - 1-hydroxybenzene-4-sulphonic acid - N - ethyl-N-phenylamide-4'-sulphonic acid are dissolved in 150 parts of hot water with 21 parts by volume of 10 N-caustic soda lye, a solution of 6.9 parts of sodium nitrite are added and, after cooling to 5°, the whole is stirred into a mixture of 42 parts of concentrated hydrochloric acid, 100 parts of water and 50 parts of ice. The neutralised diazonium compound is then coupled under the conditions given in Example 2 with 20.4 parts of phenylformyl acetic acid ethyl ester and the ester group in the coupling product is saponified with dilute caustic soda lye.

The solution of the saponification product is made neutral with acetic acid, treated with 150 parts of a copper sulphate solution (corresponding to 7 parts of copper) and then reacted at 0–10° with the diazonium salt obtained by diazotising 18.7 parts of 2-aminonaphthalene-3-carboxylic acid, which has been made acetous.

After heating to 80–85°, the copper-containing formazane complex of the above formula is precipitated by the addition of sodium chloride, filtered off, washed with sodium chloride solution and dried.

After drying, it is a dark powder which dissolves in water with a blue colour and dyes wool from a neutral to weakly acid bath in pure, fast, blue shades.

If in the above example, the 2-amino-1-hydroxybenzene - 4 - sulphonic acid - N - ethyl-N-phenylamide-4'-sulphonic acid is replaced by 32.9 parts of 4-phenylsulphonyl-2-amino-1-hydroxybenzene-3'-sulphonic acid, then a dyestuff having similar properties is obtained.

EXAMPLE 6

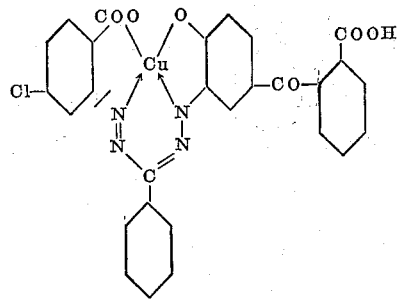

25.7 parts of 3-amino-4-hydroxybenzophenone-2'-carboxylic acid are diazotised as described in Example 3 and coupled with 20.4 parts of phenylformyl acetic acid ethyl ester. After the addition of sufficient caustic soda lye to ensure a strong alkaline reaction until the end of the saponification, the coupling product is boiled under reflux for 15 minutes. The reaction of the solution of the saponification product is then made weakly alkaline by the addition of glacial acetic acid and, at 0–10°, a neutral suspension of the diazonium salt obtained from 17.2 parts of 4-chloro-2-aminobenzene-1-carboxylic acid is added. 150 parts by volume of a copper sulphate solution (corresponding to 25 parts of crystallised copper sulphate) are then added to the reaction mixture.

On completion of the complex formation, the formazane copper complex compound is precipitated at 80–85° by the addition of saturated sodium chloride solution. The dyestuff is filtered off and washed with dilute sodium chloride solution. After drying, it is a dark powder which dyes wool from a weakly acid bath in blue shades.

If in the above example, the 3-amino-4-hydroxybenzophenone-2'-carboxylic acid is replaced by 32.8 parts of 4 - phenylsulphonyl-2-amino - 1 - hydroxybenzene-3'-sulphonic acid amide or by 32.9 parts of 4-phenylsulphonyl-2-amino-1-hydroxybenzene-3'-sulphonic acid or by 37.2 parts of 2-amino-1-hydroxybenzene-4-sulphonic acid-N-ethyl-N-phenylamide-4'-sulphonic acid, then similar dyestuffs are obtained.

The dyestuffs given in the following table are also produced by the processes described in Examples 2 to 6.

Table

| No. | Formazane compound | Metal | Shade of copper-containing formazane on wool |
|---|---|---|---|
| 1 | N-[2-carboxynaphthyl-(3)]-N'-[2'-hydroxy-5'-(3''-sulphophenylsulphonyl)-phenyl]-ms-m-methyl-phenyl formazane. | Cu | Blue. |
| 2 | N-[2-carboxynaphthyl-(3)]-N'-[2'-hydroxy-5'-sulphonic acid-N-ethyl-N-(4''-sulphophenylamide)-phenyl]-ms-m-methylphenyl formazane. | Cu | Do. |
| 3 | N-[2-carboxyphenyl-4-sulphonic acid dimethylamide]-N'-[2'-hydroxy-5'-(phenylsulphonyl-3''-sulphonic acid amide)-phenyl]-ms-phenyl formazane. | Cu | Do. |
| 4 | N-[2-carboxyphenyl-4-sulphonic acid-N-methyl-N-phenylamide]-N'-[2'-hydroxy-5'-(3''-sulphophenyl-sulphonyl)-phenyl]-ms-phenyl formazane. | Cu | Do. |
| 5 | N-[2-carboxyphenyl-4-sulphonic acid diethylamide]-N'-[2'-hydroxy-5'-sulphonic acid-N-ethyl-N-(4''-sulphophenylamide)-phenyl]-ms-phenyl formazane. | Cu | Do. |
| 6 | N-[2-carboxyphenyl-4-sulphonic acid diethylamide]-N'-[2'-hydroxy-5'-(2''-carboxybenzoyl)-phenyl]-ms-phenyl formazane. | Cu | Do. |
| 7 | N-[4-methyl-2-carboxyphenyl]-N'-[2'-hydroxy-5'-sulphonic acid-N-ethyl-N-(4''-sulphophenylamide)-phenyl]-ms-phenyl formazane. | Cu | Do. |
| 8 | N-[2-carboxyphenyl-4-sulphonic acid-n-butylamide]-N'-[2'-hydroxy-5'-(phenylsulphonyl-3''-sulphonic acid amide)-phenyl]-ms-phenyl formazane. | Cu | Do. |
| 9 | N-[2-carboxynapthyl-(3)]-N'-[2'-hydroxy-5'-(phenylsulphonyl-3''-sulphonic acid amide)-phenyl]-ms-phenyl formazane. | Cu | Do. |
| 10 | N-[5-chloro-2-carboxyphenyl]-N'-[2'-hydroxy-5'-sulphonic acid-N-ethyl-N-(3''-sulphophenylamide)-phenyl]-ms-phenyl formazane. | Cu | Do. |
| 11 | N-[2-carboxyphenyl-4-sulphonic acid-n-butylamide]-N'-[2'-hydroxy-5'-sulphonic acid-N-ethyl-N-(3''-sulphophenylamide)-phenyl]-ms-phenyl formazane. | Cu | Do. |
| 12 | N-[2-carboxyphenyl-4-sulphonic acid-N-methyl-N-phenylamide]-N'-[2'-hydroxy-5'-sulphonic acid-N-ethyl-N-(3''-sulphophenylamide)-phenyl]-ms-phenyl formazane. | Cu | Do. |
| 13 | N-[2-carboxyphenyl-4-sulphonic acid-N-methyl-N-phenylamide]-N'-[2'-hydroxy-5'-sulphonic acid-N-ethyl-N-(4''-sulphophenylamide)-phenyl]-ms-phenyl formazane. | Cu | Do. |
| 14 | N-[2-carboxyphenyl-4-sulphonic acid-N-ethyl-N-p-sulphophenylamide]-N'-[2'-hydroxy-5'-(4''-methoxy-phenylsulphonyl)-phenyl]-ms-phenyl formazane. | Cu | Do. |

Table—Continued

| No. | Formazane compound | Metal | Shade of copper-containing formazane on wool |
|---|---|---|---|
| 15 | N-[2-carboxyphenyl-4-sulphonic acid-p-sulphophenylamide]-N'-[2'-hydroxy-5'-(4''-ethoxyphenylsulphonyl)-phenyl]-ms-phenyl formazane. | Cu | Blue. |
| 16 | N-[2-carboxyphenyl-4-sulphonic acid-N-ethyl-N-p-sulphophenylamide]-N'-[2'-hydroxy-5'-(4''-methylphenylsulphonyl)-phenyl]-ms-phenyl formazane. | Cu | Do. |
| 17 | N-[2-carboxyphenyl-4-sulphonic acid-p-sulphophenylamide]-N'-[2'-hydroxy-5'-(4''-ethylphenylsulphonyl)-phenyl]-ms-phenyl formazane. | Cu | Do. |
| 18 | N-[2-carboxyphenyl-4-sulphonic acid amide]-N'-[2'-hydroxy-5'-(phenylsulphonyl)-3''-sulphonic acid methylamide)-phenyl]-ms-phenyl formazane. | Cu | Do. |
| 19 | N-[2-carboxyphenyl-4-sulphonic acid amide]-N'-[2'-hydroxy-5'-(phenylsulphonyl)-3''-sulphonic acid ethyl amide)-phenyl]-ms-phenyl formazane. | Cu | Do. |
| 20 | N-[4-methyl-2-carboxyphenyl]-N'-[2'-hydroxy-4'-sulphonic acid-N-ethyl-N-(4''-sulphophenylamide)-phenyl]-ms-phenyl formazane. | Cu | Do. |
| 21 | N-[2-carboxynaphthyl-(3)]-N'-[2'-hydroxy-4'-sulphonic acid-N-ethyl-N-(4''-sulphophenylamide)-phenyl]-ms-phenyl formazane. | Cu | Do. |
| 22 | N-[2-carboxyphenyl-5-sulphonic acid-N-ethyl-N-(p-sulphamylphenylamide)-N'-[2'-hydroxy-3'-methylphenyl-5'-sulphonic acid]-ms-phenyl formazane. | Cu | Do. |
| 23 | N-[2-carboxy-5-phenylsulphonyl-(3''-sulphonic acid-dimethylamide)-phenyl]-N'-[2'-hydroxy-3'-methyl-phenyl-5'-sulphonic acid]-ms-phenyl formazane. | Cu | Do. |
| 24 | N-[2-carboxy-5-phenylsulphonyl-(3''-sulphonic acid amide)-phenyl]-N'-[2'-hydroxy-3'-nitro-5'-methyl-sulphonyl-phenyl]-ms-phenyl formazane. | Cu | Green-blue. |
| 25 | N-[2-carboxy-5-phenyl-sulphonyl-(3''-sulphonic acid-methylamide)-phenyl]-N'-[2'-hydroxy-4'-nitro-5'-ethylsulphonyl-phenyl]-ms-phenyl formazane. | Cu | Do. |
| 26 | N-[2-carboxy-5-benzoyl-phenyl]-N'-[2'-hydroxy-4'-chlorophenyl-5'-sulphonic acid amide]-ms-phenyl formazane. | Cu | Blue. |
| 27 | N-[2-carboxy-5-benzoyl-phenyl]-N'-[2'-hydroxy-3'-chlorophenyl-5'-sulphonic acid ethyl amide]-ms-phenyl formazane. | Cu | Do. |
| 28 | N-[2-carboxy-5-methylsulphonyl-phenyl]-N'-[2'-hydroxy-5'-benzoyl-(3''-sulphonic acid dimethylamide)-phenyl]-ms-phenyl formazane. | Cu | Do. |
| 29 | N-[2-carboxy-5-ethylsulphonyl-phenyl]-N'-[2'-hydroxy-5'-benzoyl-(3''-sulphonic acid diethylamide)-phenyl]-ms-phenyl formazane. | Cu | Do. |
| 30 | N-[2-carboxynaphthyl-(3)]-N'-[2'-hydroxy-5'-sulphonic acid-N-methyl-N-(2''-chloro-4''-ethylsulphonylphenylamide)-phenyl]-ms-phenyl formazane. | Cu | Do. |
| 31 | N-[2-carboxynaphthyl-(3)]-N'-[2'-hydroxy-5'-sulphonic acid-N-methyl-N-(2''-chloro-4''-methylsulphonylphenylamide)-phenyl]-ms-phenyl formazane. | Cu | Do. |

EXAMPLE 7

4 parts of the copper-containing dyestuff according to Example 5 are dissolved in 4000 parts of water and 100 parts of well wetted wool are entered into the dyebath at 40–50°. The bath is brought to the boil within half an hour, kept at the boil for 45 minutes and then the wool is rinsed with cold water and dried. The blue dyeing obtained has very good fastness to alkali, wet, rubbing and light.

What we claim is:

1. Formazane dyestuff of the formula $$\left[ \begin{array}{c} A\diagdown_{COO}\diagup^{O}\diagdown B \\ \diagdown Cu \diagup \\ N \quad N \\ \| \quad \| \\ N \quad N \\ \diagdown C \diagup \\ | \\ \text{phenyl-X} \end{array} \right] - (Y-D)_n$$

wherein
A is a member selected from the group consisting of
  unsubstituted phenyl,
  phenyl exclusively substituted with from one to two of the substituents methyl, chloro, bromo and nitro,
  phenyl exclusively substituted with one of the substituents —COOH, —SO₃H and acetylamino,
  unsubstituted naphthyl,
  naphthyl substituted with —SO₃H,
B is a member selected from the group consisting of
  unsubstituted phenyl,
  phenyl substituted with from one to two of the substituents chloro, bromo, nitro, —SO₃H and methyl,
D is a member selected from the group consisting of
  unsubstituted phenyl,
  phenyl substituted with from one to two of the substituents methyl, chloro and bromo,
  phenyl substituted with one of the substituents methoxy, ethoxy, —SO₃H, —COOH, —SO₂NH₂ and —SO₂CH₃,
Y is a member selected from the group consisting of —SO₂—, —SO₂—N'-lower alkyl and —CO—,
X is a member selected from the group consisting of H, Cl, CH₃, OCH₃, and SO₃H, and
$n$ is one of the numerals 1 and 2, each Y—D group being linked in one of the positions 4 and 5 to one of said radicals A and B when said radical is unsubstituted phenyl, said radicals A and B each bearing no more than one Y—D group, the group —COO— being bonded to the aromatic nucleus A in o-position to the —N=N— bridge, and the —O— bridge at B being bonded to the aromatic nucleus B in o-position to the N—N= bridge, 2. The formazane dyestuff of the formula

[Structural formula showing copper-complexed formazane with phenyl-SO₂—N(C₂H₅)—phenyl-SO₃H substituent]

3. The formazane dyestuff of the formula

[Structural formula showing copper-complexed formazane with Cl substituent and phenyl-SO₂—N(C₂H₅)—phenyl-SO₃H substituent]

4. The formazane dyestuff of the formula
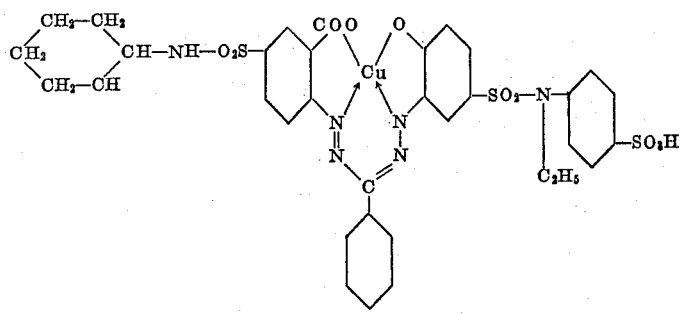
5. The formazane dyestuff of the formula
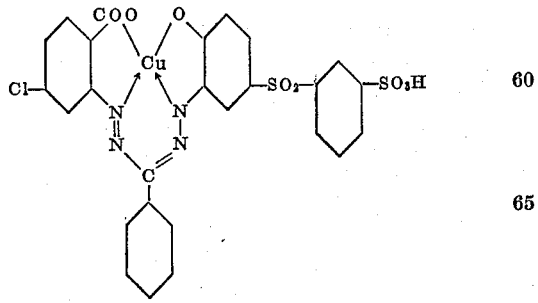
6. The formazane dyestuff of the formula
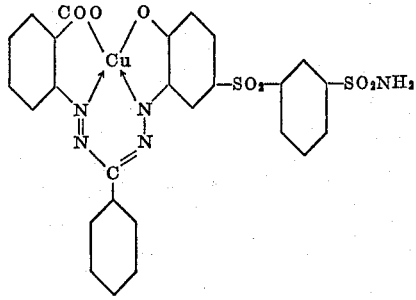
References Cited in the file of this patent
UNITED STATES PATENTS
| | | |
|---|---|---|
| 2,662,074 | Brooks | Dec. 8, 1953 |
| 2,662,075 | Brooks | Dec. 8, 1953 |
| 2,864,815 | Ziegler | Dec. 16, 1958 |
| 2,928,823 | Senn et al. | Mar. 15, 1960 |
| 2,969,350 | Dorlars et al. | Jan. 24, 1961 |